United States Patent

Jaffer et al.

(10) Patent No.: US 6,743,006 B2
(45) Date of Patent: Jun. 1, 2004

(54) DIE FOR EXTRUDING FLOWABLE MATERIALS AND HAVING A STATIC MIXER THEREIN

(75) Inventors: Shaffiq Amin Jaffer, Loveland, OH (US); Mark Lewis Agerton, Cincinnati, OH (US); Geoffrey Marc Wise, Reading, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 154 days.

(21) Appl. No.: 10/035,720

(22) Filed: Nov. 9, 2001

(65) Prior Publication Data

US 2003/0091677 A1 May 15, 2003

(51) Int. Cl.⁷ ............................................... B29C 47/14
(52) U.S. Cl. .................... 425/132; 425/462; 425/133.5; 425/206; 425/174.4
(58) Field of Search ............................... 425/132, 133.5, 425/131.1, 206, 174, 174.4, 462

(56) References Cited

U.S. PATENT DOCUMENTS

| | | | |
|---|---|---|---|
| 2,803,041 A | * 8/1957 | Hill et al. | 425/132 |
| 3,405,425 A | 10/1968 | Buckley et al. | 425/133.5 |
| 3,565,737 A | 2/1971 | LeFevre et al. | 428/60 |
| 3,619,429 A | * 11/1971 | Torigai et al. | 425/174.2 |
| 3,782,870 A | 1/1974 | Schippers | |
| 3,792,839 A | * 2/1974 | Gidge | 366/87 |
| 4,128,386 A | 12/1978 | Wissinger et al. | 425/462 |
| 4,185,951 A | 1/1980 | Webermeier et al. | 425/133.5 |
| 4,201,480 A | * 5/1980 | Brand | 425/461 |
| 4,454,087 A | * 6/1984 | Hayashi et al. | 425/209 |
| 4,478,516 A | * 10/1984 | Kessler | 425/204 |
| 4,568,506 A | 2/1986 | Kiriyama et al. | |
| 5,176,925 A | 1/1993 | Weber et al. | |
| 5,372,765 A | * 12/1994 | Chen et al. | 264/101 |
| 6,203,188 B1 | * 3/2001 | Maurer et al. | 366/338 |

* cited by examiner

Primary Examiner—Robert Davis
Assistant Examiner—Joseph S Del Sole
(74) Attorney, Agent, or Firm—Larry L. Huston; Leonard W. Lewis; Steven W. Miller

(57) ABSTRACT

An extrusion/coating die. The die has an internal cavity and one or more static mixers in the die cavity. The static mixer fills the die cavity at its respective cross section. The die may also have one or more auxiliary inlets for separately admitting material/energy to the die.

18 Claims, 3 Drawing Sheets

DIE FOR EXTRUDING FLOWABLE MATERIALS AND HAVING A STATIC MIXER THEREIN

FIELD OF THE INVENTION

The present invention relates to dies for extruding flowable materials and more particularly dies for extruding two or more materials.

BACKGROUND OF THE INVENTION

Coathanger dies for extruding flowable materials are well known in the art. For example, U.S. Pat. No. 5,175,925 issued Jan. 5, 1993 to Weber et al. teaches an extruding die having a static mixer insert. The static mixer takes the form of upstanding pins of various cross sections and arranged in substantially equally spaced sets. However, the Weber et al. die allows significant bypass flow on either side of the sets of pins. Further, Weber et al. does not allow for bilateral mixing which may be necessary for certain reactive components to achieve adequate blending and homogeneity.

U.S. Pat. No. 4,568,506 issued Feb. 4, 1986 to Kiriyama et al. teaches an extrusion die having a static mixer therein. Various commercially available static mixers are suggested. It is believed by the present applicants that each such static mixer has a round cross-section, except the Komax mixer which is said to have a square cross-section. Accordingly, the commercially available static mixers cannot fill the Kiriyama et al. coathanger die and therefore allow for bypass flow. Laminated plate type static mixers are also shown. However, Kiriyama et al. teaches fluids do not interact within the laminated plate type static mixer, and thus only allow for mixing at the discharging zone of the laminate plate type static mixer.

Further, the art does not teach a way to provide coathanger dies which deal with reactive materials having a particularly fast reaction time. If the reactive materials are introduced into the coathanger die and mixed, the residence time must be short enough to allow the final composition to be extruded to the desired shape prior to curing or other reactions occurring.

SUMMARY OF THE INVENTION

The invention comprises a die for extruding or otherwise providing flowable material therethrough in a longitudinal direction. The die has a die inlet for admitting the flowable material and a die outlet for extruding the flowable material. The die inlet and die outlet are oppositely disposed on a longitudinal axis. The die outlet has a cross sectional area defining a die outlet plane with a major axis and a minor axis. The die has a cavity connecting the die inlet and die outlet. The cavity has a plurality of cross sections perpendicular to the longitudinal direction. The cavity may have a static mixer filling the cavity at any cross section.

In another embodiment the invention comprises a die for extruding flowable material in a longitudinal direction. The die has a first die inlet and one or more auxiliary die inlets each for admitting flowable material into said die. The die further comprises a die outlet for extruding flowable material from said die. The first die inlet and auxiliary die inlets are spaced apart from each other. The first die inlet and/or auxiliary die inlet may also be used to admit energy into the die cavity. The energy may be used to cure/crosslink/disperse/blend one or more materials in the die cavity.

DETAILED DESCRIPTION OF THE INVENTION

Figure 1:
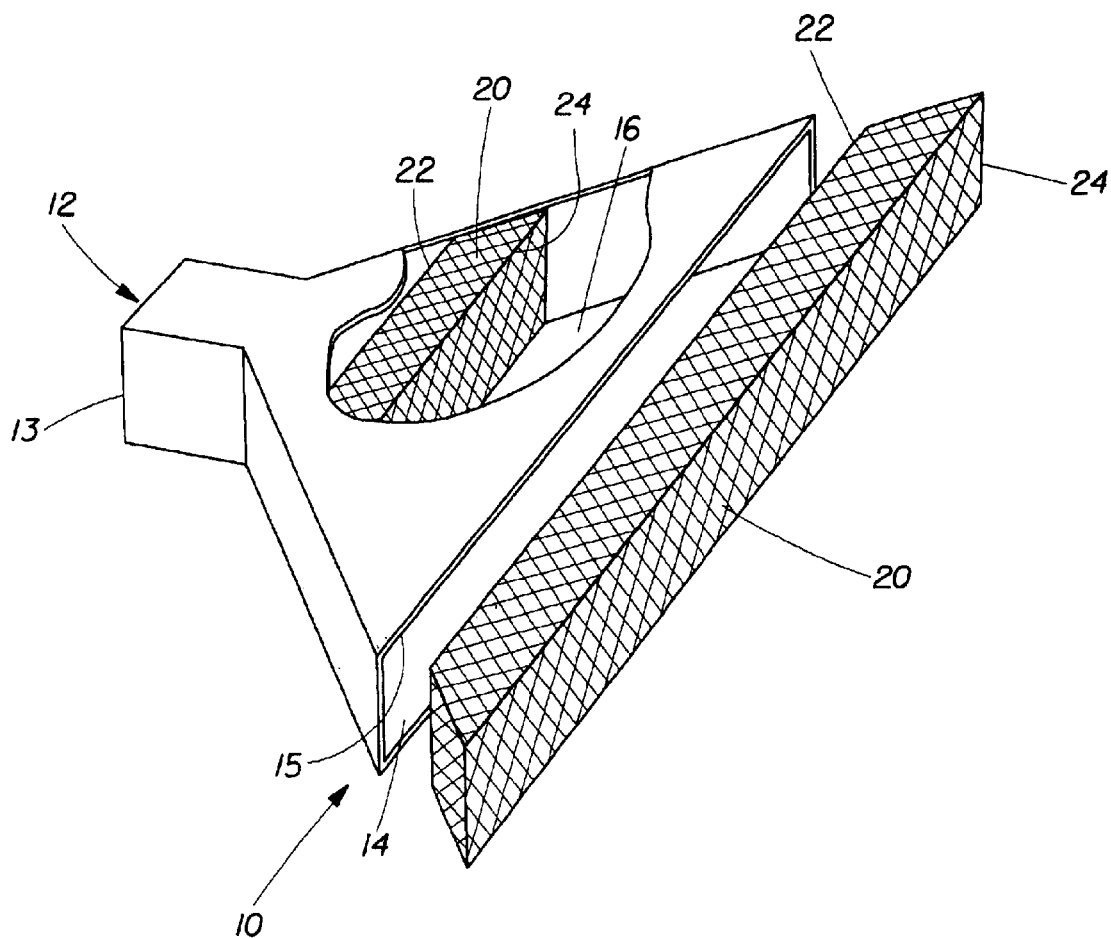
FIG. 1 is an exploded perspective view, shown partially cutaway, of a die according to the present invention and having plural static mixers.

Referring to FIG. 1, the invention comprises a coathanger die 10 although other dies 10, such as T-dies 10, Y-dies 10, and other extrusion and coating dies 10 are contemplated and within the scope of the present invention. The die 10 has at least one die inlet 12 for admitting flowable materials, a die outlet 14 for expelling the flowable materials and a die cavity 16 connecting the inlet and the outlet 12, 14. Optionally a static mixer 20 may be disposed internal to the die cavity 16. While the following discussion relates to extruding/coating two or materials through the die 10, the invention is also applicable to dies 10 used to extrude/coat a single material.

Examining the components in more detail, the die 10 has at least a first die inlet 12. The first die inlet 12 is typically longitudinally opposed to the die outlet 14. The longitudinal direction is the principal direction of the flow of material through the die 10. The cross direction is the direction perpendicular to the longitudinal direction and lying within the plane of the die 10, i.e., parallel to the major axis as defined below. The first die inlet 12 should be sized to permit the desired quantity/flow rate of material to be admitted to the die 10. The first die inlet 12 defines a first die inlet plane 13 which is the plane where the material first enters the die 10 through that inlet 12.

The die 10 also has a die outlet 14. Multiple die outlets 14 are contemplated, although only a single die outlet 14, longitudinally opposed to the first die inlet 12, is shown in the illustrative figures. The die outlet 14 is preferably downstream of the static mixer 20, if provided. If a die 10 having multiple outlets 14 is selected, the outlets 14 may be of different sizes/shapes and/or alternately disposed with respect to one or more static mixers 20. The die outlet 14 has a die outlet plane 15 which is the plane where the material last contacts the die 10 during operation. While the figures illustrate dies 10 having rectilinear die inlet and outlet planes 13, 15, embodiments having curvilinear/compound curve die inlet and/or outlet planes 13, 15 are also contemplated.

The die outlet plane 15 may have an aspect ratio greater than one or the die outlet plane 15 aspect ratio may be equal to one in a degenerate case. The aspect ratio is determined by ratio of the major axis to the minor axis of the die outlet plane 15. The major axis of the die outlet 14 is the greatest distance across the die outlet plane 15. The minor axis is taken perpendicular to and is shorter than the major axis and coincides with the center of the die outlet plane 15. The die inlet and outlet planes 13, 15 may be mutually parallel as shown, parallel to the major or minor axes or disposed in acute angular relationship relative to the major or minor axes.

The cavity 16 connecting the first die inlet 12 and die outlet 14 may have any desired cross section, with high aspect ratio cross sections being generally preferred. A particularly preferred cross section for the die 10 cavity is hexagonal to reduce dead zones in material flow through the die 10. Two opposed vertices of the hexagon may be coincident the major axis.

Optionally a static mixer 20 may be disposed in the die cavity 16. As used herein, a "static mixer 20" is an assembly of one or more elements that mixes or blends materials flowing through a flow conduit by subdividing and recombining the flow. An "element" is an assembly of bars, each bar dividing the flow into at least two streams that are combined with separate streams and mixed together. The "bar" is the portion of the static mixer 20 that interrupts and divides the fluid flow.

The bars in each element are preferably discrete, optionally parallel, and may have a fixed and predetermined geometry. Inside a static mixer 20, fluids flow in a conduit past the stationary bars. The bars are arranged generally in the same direction as the flow of fluid. Consequently, the relative velocities of the fluids may be relatively constant across the cross section of the flow. Because such relative velocities are relatively constant, static mixers 20 can be predictably sized according to production needs. The static mixer 20 may be relatively short in the flow direction, not cause excessive pressure losses and yet ensure sufficient homogenization.

The bars may be oriented relative to one another from 0 to 180 degrees within the plane of the cross section of the flow. Each element is constructed in a lattice framework of bars inclined at an angle of 45 degrees relative to the flow direction, although orientations from 0 to 180 degrees may be suitable. The bars are oriented in a periodic manner wherein adjacent bars intersect within the plane of the cross section from 0 to 180 degrees. This geometry creates channels for the discrete and/or continuous phase/mixture to flow through whereby the surface of the bar is wetted.

Additionally, it is desirable that the bars of the static mixer 20 have a particular angular orientation relative to the flow direction. The proper angular orientation provides a suitable amount of shear to the two phases being mixed and can be found using methods well known in the art and which will not be repeated here. For the embodiments described and claimed herein, a bar orientation of 0 to 90, typically 30 to 60 and more typically 45 degrees relative to the flow direction has been found suitable.

The surface properties of the elements are chosen such that at least one phase of the extruded material preferentially wets this surface. The elements may be constructed of or coated with steel, aluminum, TEFLON™, polypropylene, etc. The ends of the bar comp to a common intersection, which may be flat, rounded, or have a sharp edge. The bars may have a particular cross-section, such as triangular, curved, parallelogram drop-shaped or elliptical. The static mixer 20 may be made according to the teachings of commonly assigned U.S. application Ser. No. 09/911,774 filed Jul. 24, 2001 in the names of Catalfamo et al., now U.S. Pat. No. 6,550,960, B2, and incorporated herein by reference.

The static mixer 20 has a perimeter which is closely matched to the inside dimensions of the coathanger die 10 or other flow channel into which the static mixer 20 is inserted. Any cavity 16 of the die outlet 14 having a cross section of reasonable hydraulic radius may be used.

The static mixer 20 has a static mixer inlet 20 and a static mixer 20 outlet defining a static mixer inlet plane 22 and a static mixer outlet plane 24, respectively. The static mixer inlet plane 22 and static mixer outlet plane 24 are the planes 22, 24 where the flowable material first and last contacts the static mixer 20, respectively. The static mixer inlet plane 22 and static mixer outlet plane 24 may be rectilinear and mutually parallel as shown. Alternatively, the static mixer inlet plane 22 and/or static mixer outlet plane 24 may be curvilinear or comprise compound curves. In yet another embodiment, the static mixer 20 may fill the die cavity 16, so that mixing occurs throughout the entire path the material encounters from the die inlet 14 to the die outlet 16.

The static mixer 20 causes blending/mixing of all materials contained within that portion of the die cavity 16 where the static mixer 20 is disposed. The static mixer 20 preferably causes or promotes bilateral blending/mixing of materials which flow therethrough. Specifically, as materials flow through the static mixer 20 in the longitudinal direction, or in the cross direction, preferably the static mixer 20 causes blending/mixing/flow of these materials in the directions parallel to both the major and minor axes.

The static mixer outlet plane 24 and the die outlet plane 15 may be juxtaposed so that they are relatively closely spaced or even be coincident. This arrangement provides for efficacious extrusion of reactive materials mixed by the static mixer 20, particularly where the materials require a short residence time before extrusion. Certain materials, particularly reactive materials, upon combining require that a relatively short residence time in the die 10 occur. If the residence time is too great, curing/crosslinking may occur and it may become impractical to extrude the combined materials to the desired shape.

Prophetically, the reaction times of the materials could be selected and balanced with the flow rate through the static mixer 20 so that incipient, or if desired even significant, curing/crosslinking occurs as the extrudate exits the die outlet plane 15. If adequate curing/crosslinking occurs, prophetically the extrudate could be in the form of several small filaments, one filament being extruded though each void in the static mixer 20. This arrangement advantageously eliminates the need for a separate die 10 to form the individual filaments. The size and cross section of each filament will be determined, in part, by the size and cross section of the voids in the static mixer 20. The filaments may later be carded, or formed into woven or nonwoven sheet goods, as desired.

Figure 2:
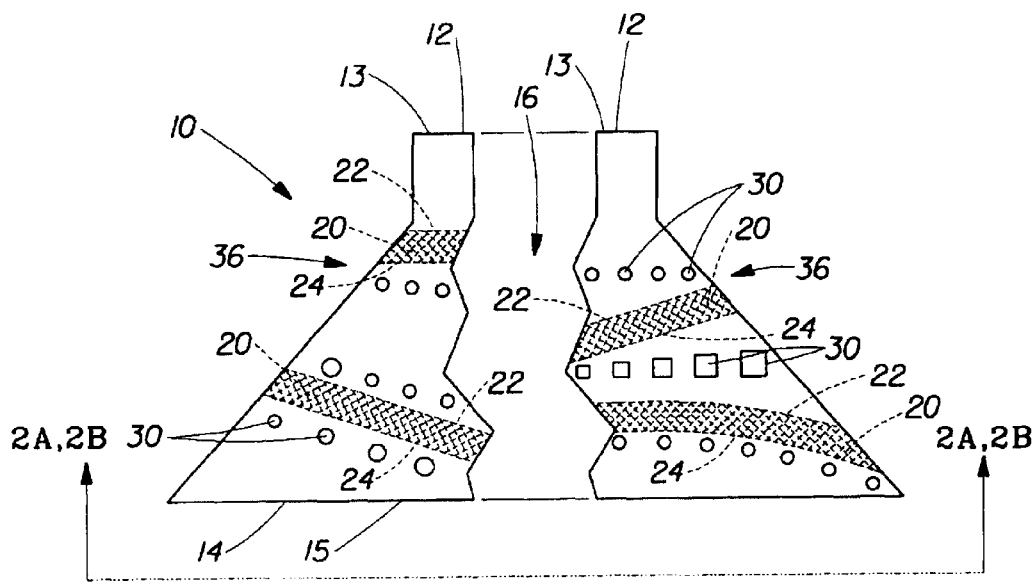
FIG. 2 is a broken top plan view of alternative embodiments, having plural static mixers disposed in series, and plural banks of auxiliary inlets.

Referring to FIG. 2, if desired, the die 10 may have a plurality of auxiliary die inlets 30, providing the die 10 with a first die inlet 12 and at least a second die inlet 12. If one or more auxiliary die inlets 30 are used in addition to the first die inlet 12, the one or more auxiliary die inlets 30 may be disposed in acute angular relationship to the first die inlet 12. For example, the auxiliary die inlets 30 may be disposed on the top or bottom of the die 10 and disposed substantially perpendicular to the first die inlet 12. The angular relationship between the first die inlet 12 and the auxiliary die inlet 30 is determined by the angular relationship between the respective die inlet planes 13. The die inlet plane 13 is the plane defined by the perimeter of the die inlet 12, 30 (without regard to its shape) at the position where the die inlet 12, 30 enters the die 10.

The auxiliary inlets 30 may be arranged in banks 36, with each bank 36 comprising a plurality of auxiliary inlets 30. If a plurality of auxiliary inlets 30 are disposed on the top or bottom of the die 10, each auxiliary inlet 30 may comprise a small injection port. The auxiliary inlets 30 may be rectilinearly disposed in a bank 36 and more particularly may be disposed parallel to the major axis of the die 10 outlet plane, e.g. substantially perpendicular to the longitudinal direction. Each auxiliary inlet 30 may be equally spaced from the adjacent auxiliary inlet 30 or the auxiliary inlets 30 may be unequally spaced apart. For example, the auxiliary inlets 30 may be more closely spaced near the longitudinal centerline of the die 10 and less closely spaced near the edges of the die 10, or vice versa.

Another way to accommodate different flow rates of material entering different positions of the die 10 is to have auxiliary inlets 30 of varying sizes. Larger auxiliary inlets 30 may be disposed in the regions of the die 10 corresponding to the positions of the die 10 outlet having greater cross-sectional areas. It will be apparent that various combinations of first and auxiliary die inlets 12, 30 sizes/spacings may be utilized to provide the desired flow rate and flow distribution.

Alternatively the, auxiliary die inlets 30 may be arranged in multiple banks 36. Each bank 36 may comprise auxiliary inlets 30 arranged in various patterns, including but not limited to a grid, a curvilinear array, a rectilinear array, etc. More particularly the auxiliary inlets 30 may be disposed in a bank 36 parallel to the major axis of the of die outlet 14. Each bank 36 of auxiliary die inlets 30 may be successively spaced further from or closer to an adjacent bank 36 of auxiliary die inlets 30, to achieve proper longitudinal disposition. This arrangement allows different materials to be injected to different positions of the die 10, providing the benefit that different materials may have different residence times/reaction times with the other materials in the die 10. Each bank 36 of auxiliary inlets 30 may have its own unique size/spacing/shape/hydraulic radius of auxiliary inlets 30, or the auxiliary inlets 30 in different banks 36 may have a common size/spacing/shape/hydraulic radius.

The auxiliary inlets 30 are typically, but not necessarily, disposed downstream of said first die inlet 12. The auxiliary inlets 30 have a cross-sectional area taken at the plane where the auxiliary inlets 30 enter the die 10. The first die inlet 30 will, likewise, have a first die inlet 12 cross-sectional area. The cross sectional-area of an individual auxiliary die inlet 30, a bank 36 of auxiliary die inlets 30, or all auxiliary die inlets 30 in the die 10 may be greater than or, typically less than, the cross-sectional area of the first die inlet 12.

If desired the coathanger die 10 may comprise a plurality of static mixers 20 disposed in series. Static mixers 20 are considered to be disposed in series if, in the longitudinal direction, at least one material passes through two or more static mixers 20 between the die inlet 12 and the die outlet 14. If a plurality of static mixers 20 is disposed in series, the static mixers 20 may be arranged in successive order such that the static mixers 20 become coarser, or more likely finer, or remain the same as the die outlet 14 is approached. A static mixer 20 is considered to be finer than a preceding static mixer 20, or any other static mixer 20 under consideration if that static mixer 20 has a greater surface area to void volume ratio or a smaller hydraulic diameter.

If desired, a plurality of banks 36 of auxiliary die inlets 12 may be advantageously disposed with respect to a plurality of static mixers 20. For example, the banks 36 of auxiliary die inlets 12 may be alternately disposed with the static mixers 20. This arrangement provides the benefit that a first material may be mixed by each static mixer 20, a second material may be mixed by one fewer static mixers 20, a third material by even fewer static mixers 20, etc. Thus by properly selecting the number and disposition of the auxiliary die inlets 30 and static mixers 20, the die 10 may be tailored to specific and complex material combinations and extrude combinations unattainable in the dies 10 of the prior art.

The coathanger die 10 of the present invention may be tailored to provide cross directional zone control of the extrudate. As noted above, the longitudinal and/or cross direction spacing, size and distribution of auxiliary die inlets 12 may be arranged to provide for a larger/smaller quantity of one or more materials to be admitted to the die 10 at different positions in the cross direction. For example, at any longitudinal position in the coathanger die 10, one may desire a larger or smaller quantity of material to be admitted to the die 10 as the longitudinal centerline of the die 10 is approached in the cross direction. Further, a first quantity/type of material may be admitted to the die inlets 12 closer to the longitudinal centerline and a second quantity/type of material may be admitted to the die inlets 12 closer to the edges of the die 10. This arrangement provides the advantage that nonhomogenous extrudates may be utilized, so that the edge and center properties of the final extrudate are different. Thus, by properly selecting the number and position of the auxiliary die inlets 12, and the quantity/type of materials, the final extrudate may be controlled in both the longitudinal and cross directions.

One or more static mixers 20 in the die 10 cavity may have a constant or variable bar/element structure. For example, the surface area to void volume ratio of the static mixers 20 may remain constant, increase or decrease as the longitudinal axis is approached in the cross direction. Also, the longitudinal dimension of one or more static mixers 20 may be constant or variable. Of course, the coathanger die 10 may be provided with a modular construction, so that one or more static mixers 20 may be added, removed or interchanged, as desired. Also, one or more auxiliary inlets 30 may be resized or even plugged with a modular construction. Likewise, longitudinally oriented static mixers 20, or static mixers 20 oriented in a skewed angular relationship may have similar variations.

Figure 2A:
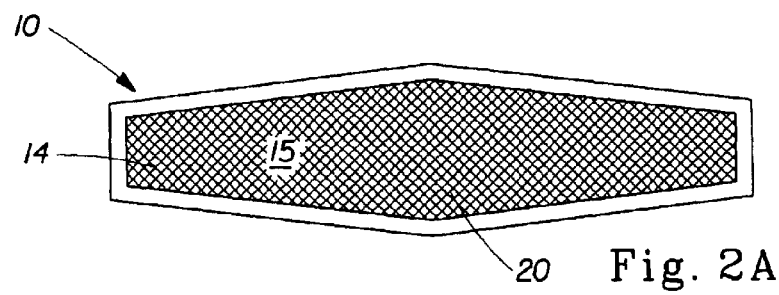
FIGS. 2A and 2B are frontal views of the outlets of the embodiments represented in broken FIG. 2 and taken along Line 2A, 2B-2A, 2B and showing the variable cross sections of the die outlet plane.
Figure 2B:
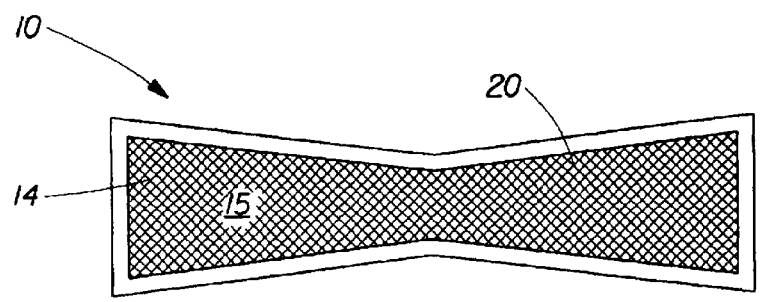

Referring to FIGS. 2A and 2B, if the cross section of the die 10 outlet is not uniform at all positions on the major axis, i.e. the cross section is irregular, the auxiliary inlets 30 may be more closely spaced where the cross sectional area is greater. This arrangement prophetically provides the benefit of more longitudinal and uniform flow of material through the die cavity 16. The cross section of the die outlet plane 15 may increase or decrease, monotonically or nonmontonically, as the edges/centerline of the die 10 are approached.

Figure 3:
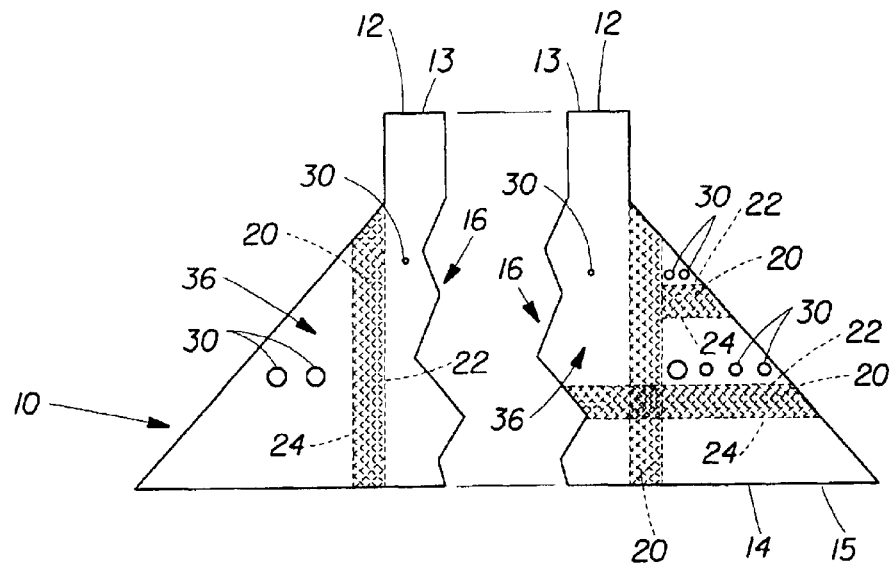
FIG. 3 is a broken top plan view of alternative embodiments having the top removed for clarity and plural static mixers disposed parallel to the longitudinal flow direction.

Referring to FIG. 3, another way cross direction zone control may be achieved is by providing one or more static mixers 20 having a vector component parallel to and preferably coincident the longitudinal centerline of the die 10. Such static mixers 20 may be symmetrically or asymmetrically disposed with respect to the longitudinal centerline. This arrangement provides the advantage that a first combination of materials may occur at the center of the extrudate and a second combination of materials may occur at the edges of the extrudate. Of course, multiple static mixers 20 may be provided on each side of the longitudinal centerline as well.

In yet another alternative embodiment static mixers 20 may be disposed parallel to both the longitudinal direction and the cross direction. Some of these static mixers 20 may extend the full length of the die cavity 16 at their respective positions, while other static mixers 20 may terminate upon intercepting other static mixers 20. Static mixers 20 may be also disposed in angular relationship relative to the longitudinal and cross directions.

If desired, the auxiliary inlets 30 may be used to provide energy input to the die cavity 16, instead of or in addition to admitting materials to the die 10 cavity. For example, materials to be extruded from the die 10 may be cured/crosslinked/dispersed/blended or otherwise become more suitable for their intended purpose in the presence of or within the addition of various forms of energy. The auxiliary inlets 30 may be used to admit thermal, ultra-violet, visible light, infrared, magnetic, X-ray, microwave, radio frequency, ultrasonic, actinic radiation and/or other types of energy to the die 10 cavity. If desired, the energy may be admitted at the plane where the auxiliary inlets 30 intercept the die 10.

Figure 4:
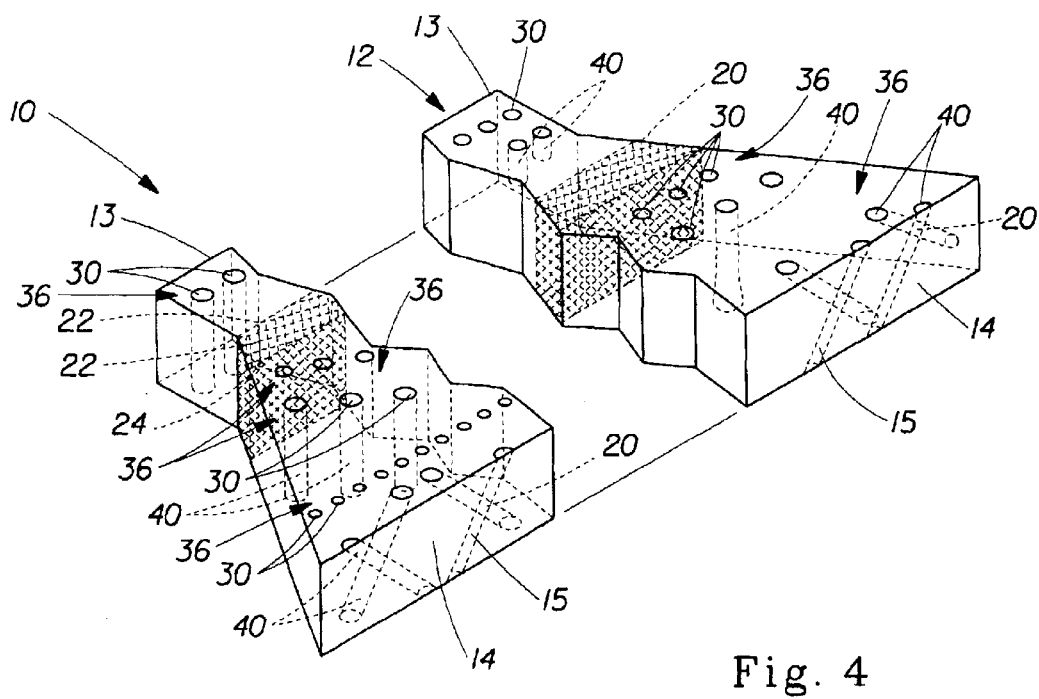
FIG. 4 is a broken perspective view of an alternative embodiment showing various insert tubes.

Referring to FIG. 4, alternatively, insert tubes 40 may be provided which penetrate the die 10, past the plane where the auxiliary inlets 30 intercept the die 10. This arrangement provides the benefit that the energy may be imparted to the materials within the die 10 at various positions throughout the depth, e.g. parallel to the minor axes in FIGS. 2A–2B, of the die cavity 16.

The insert tubes 40 may have a proximal end disposed at the auxiliary die inlet 30 and a distal end disposed internal to the die cavity 16. The distal ends of the insert tubes 40 may have common or different positions in the die cavity 16, relative to the major axis, minor axis or longitudinal centerline. By properly selecting the type, placement and amount of energy imparted to materials within the die cavity 16, curing/crosslinking/dispersing/blending of such materials may occur uniformly or nonuniformly, as desired.

For example, it may be advantageous to impart a first quantity of energy to material at a first position in the die cavity 16 and a second quantity of energy at a second position in the die cavity 16. If materials are admitted via auxiliary die inlets 30 intermediate such first and second positions, such materials will only be exposed to the second energy influx.

Furthermore, the bars of the static mixer 20 may provide the dual functionality of mixing materials flowing therepast and providing energy input to materials contained in the static mixer 20. Particularly, if selected bars of one or more static mixers 20 are hollow, they may serve as both bars and insert tubes 40. Such bars may be made of a material not opaque to, and preferably at least partially transparent to, the emission therethrough of the particular energy being used. In such an embodiment the entire bar may transmit energy therefrom or the bar may have a window at least partially transparent to the transmission of energy therethrough. Suitable materials include, but are not limited ceramics, plastics, metals such as stainless steel and sintered metals, and fiber optics materials such as glass. This arrangement allows energy to be transmitted to the die 10, enter the die 10 through one or more auxiliary die inlets 30 and be released to the material in the die cavity 16.

Of course, this arrangement may be expanded to include any number and combination of insert tubes 40, auxiliary inlets and static mixers 20. The insert tubes 40 may be used to provide material to a desired location in the die 10, in addition to providing energy input to materials contained within the die 10. If the insert tubes 40 are used to provide material to the die cavity 16, the distal ends of the insert tubes 40 may be staggered in the direction parallel to the minor axis. This arrangement prophetically allows for stratification of the extrudate.

Additionally the insert tubes 40 may be disposed in patterns and the energy applied from such tubes may be pulsed or applied in a timed fashion such that materials receiving such energy may be cured/crosslinked/dispersed/blended randomly or in an ordered pattern.

What is claimed is:

1. A die for extruding flowable material therethrough in a longitudinal direction, said die having a die inlet for admitting flowable material and a die outlet for expelling flowable material, said die inlet and die outlet being oppositely disposed on a longitudinal axis, said die outlet having a cross sectional area defining a die outlet plane having a major axis and a minor axis orthogonal thereto, said major axis being greater than or equal to minor axis, said die having a cavity connecting said die inlet and said die outlet, said cavity having a plurality of cross sections perpendicular to said longitudinal axis, said cavity having a static mixer therein, said static mixer having openings therethrough oriented substantially at an angle relative to said longitudinal direction, said static mixer having a static mixer outlet defining a static mixer outlet plane filling said cavity at a cross section, said static mixer causing flowable material to flow in a first direction having a component parallel to said major axis of said die outlet plane and later in a second direction having a component parallel to said minor axis of said die outlet plane as said flowable material is within said cavity, wherein said static mixer outlet plane and said die outlet plane are coincident.

2. A die for extruding flowable material therethrough in a longitudinal direction, said die having a die inlet for admitting flowable material and a die outlet for expelling flowable material, said die inlet and die outlet being oppositely disposed on a longitudinal axis, said die outlet having a cross sectional area defining a die outlet plane having a major axis and a minor axis orthogonal thereto, said major axis being greater than or equal to minor axis, said die having a cavity connecting said die inlet and said die outlet, said cavity having a plurality of cross sections perpendicular to said longitudinal axis, said cavity having a plurality of static mixers therein, said plurality of static mixers being disposed in series between said die inlet and said die outlet whereby at least a portion of said flowable material passes through two or more of said static mixers of said plurality, one said static mixer comprising a stage of bars imparting flow to said flowable material in a first direction relative to said longitudinal direction, and a second static mixer of said plurality of static mixers comprising bars imparting flow to said flowable material in a second direction relative to said longitudinal axis, said first direction and said second direction defining an included angle therebetween of at least 45 degrees, at least one said static mixer filling said cavity at a cross section imparting bilateral flow to flowable material as said flowable material is within said cavity and passing through said static mixer.

3. A die according to claim 1 wherein said static mixer has a static mixer inlet defining a static mixer inlet plane and a static mixer outlet defining a static mixer outlet plane, said static mixer inlet plane and said static mixer outlet plane each being flat and mutually parallel.

4. A die according to claim 3 wherein said die outlet plane and said static mixer outlet plane are mutually parallel.

5. A die according to claim 1 having a cross direction orthogonal to said longitudinal direction, wherein said static mixer has a first surface area to void volume ratio coincident said longitudinal axis and a second surface area to void volume ratio at a position spaced from said longitudinal axis in the cross direction, said first ratio being different than said second ratio.

6. A die according to claim 1 further comprising a plurality of auxiliary inlets for admitting material or admitting energy to said cavity of said die.

7. A die according to claim 2 further comprising a plurality of auxiliary inlets for admitting material or admitting energy to said cavity of said die.

8. A die according to claim 2 wherein said first static mixer has a first length and said second static mixer has a second length, said first length and said second length being taken in said longitudinal direction, said first length being greater than said second length.

9. A die according to claim 8 having a first static mixer with a first surface area to void volume ratio and a second static mixer with a second surface area to void volume ratio said first ratio being greater than said second ratio.

10. A die according to claim 2 further comprising a plurality of auxiliary inlets far admitting material, energy or both to said cavity of said die, said auxiliary inlets being intermediate said first static mixer and said second static mixer.

11. A die according to claim 10 further comprising a plurality of inlet tubes, said inlet tubes penetrating said die cavity for admitting material or energy to said die cavity.

12. A die according to claim 11 wherein a plurality of inlet tubes are disposed in at least one said static mixer.

13. A die according to claim 2 wherein at least one said static mixer comprises a plurality of hollow bars, said bars admitting material or energy to said cavity of said die.

14. A die according to claim 2 wherein one said static mixer is substantially parallel to said longitudinal direction.

15. A die according to claim 14 having a longitudinal centerline, and comprising at least a first static mixer disposed on a first side of said longitudinal centerline and at least a second static mixer disposed on a second side of said longitudinal centerline, said first static mixer and said second static mixer not intercepting said longitudinal centerline.

16. A die according to claim 14 wherein said static mixer substantially parallel to said longitudinal direction intercepts a static mixer substantially perpendicular to said longitudinal direction.

17. A die according to claim 16 having a cross direction perpendicular to said longitudinal direction and a width taken in said cross direction, wherein said static mixer substantially perpendicular to said longitudinal direction extends the width of said die.

18. A die for extruding flowable material therethrough in a longitudinal direction, said die having a die inlet for admitting flowable material and a die outlet for expelling flowable material, said die inlet and die outlet being oppositely disposed on a longitudinal axis, said die outlet having a cross sectional area defining a die outlet plane having a major axis and a minor axis orthogonal thereto, said major axis being greater than or equal to minor axis, said die having a cavity connecting said die inlet and said die outlet, said cavity having a stalk mixer therein, said static mixer having a plurality of bars for directing the flow of material in said die cavity, at least one said bars for admitting energy through a window substantially transparent to the transmission of energy therethrough to said cavity of said die.

* * * * *

UNITED STATES PATENT AND TRADEMARK OFFICE
CERTIFICATE OF CORRECTION

PATENT NO. : 6,743,006 B2
DATED : June 1, 2004
INVENTOR(S) : Shaffiq Amin Jaffer et al.

It is certified that error appears in the above-identified patent and that said Letters Patent is hereby corrected as shown below:

Title page,
Item [*] Notice, insert -- This patent is subject to a terminal disclaimer. --

Column 3,
Line 50, delete "comp" and insert therefor -- come --.
Line 53, after the word "parallelogram", insert a comma, -- , --.
Line 57, delete the comma "," after "6,550,960".

Column 10,
Line 22, delete "stalk" and insert therefor -- static --.

Signed and Sealed this

Twenty-third Day of November, 2004

JON W. DUDAS
*Director of the United States Patent and Trademark Office*